(12) United States Patent
Zhang et al.

(10) Patent No.: US 8,418,242 B2
(45) Date of Patent: Apr. 9, 2013

(54) METHOD, SYSTEM, AND DEVICE FOR NEGOTIATING SA ON IPV6 NETWORK

(75) Inventors: Dong Zhang, Chengdu (CN); Lifeng Liu, Chengdu (CN)

(73) Assignee: Chengdu Huawei Symantec Technologies Co., Ltd., Chengdu (CN)

( * ) Notice: Subject to any disclaimer, the term of this patent is extended or adjusted under 35 U.S.C. 154(b) by 130 days.

(21) Appl. No.: 12/987,502

(22) Filed: Jan. 10, 2011

(65) Prior Publication Data

US 2011/0107104 A1    May 5, 2011

Related U.S. Application Data (63) Continuation of application No. PCT/CN2009/072035, filed on May 27, 2009.

(30) Foreign Application Priority Data

Jul. 11, 2008 (CN) .......................... 2008 1 0137713

(51) Int. Cl.
  *H04L 12/22* (2006.01)
  *H04L 12/24* (2006.01)
(52) U.S. Cl. .......................................... 726/14; 713/151
(58) Field of Classification Search .................. None
  See application file for complete search history.

(56) References Cited

U.S. PATENT DOCUMENTS

| | | | |
|---|---|---|---|
| 7,370,197 B2 | 5/2008 | Huitema | |
| 2004/0193875 A1 | 9/2004 | Aura | |
| 2005/0008159 A1 | 1/2005 | Grilli et al. | |

FOREIGN PATENT DOCUMENTS

| | | |
|---|---|---|
| CN | 1741523 A | 3/2006 |
| CN | 1878169 A | 12/2006 |
| CN | 1937836 A | 3/2007 |
| CN | 101227494 A | 7/2008 |
| EP | 1665725 A1 | 6/2006 |
| GB | 2 424 154 A | 9/2006 |
| WO | WO 2005029811 A1 | 3/2005 |

OTHER PUBLICATIONS

T. Aalto. IPv6 Authentication Header and Encapsulated Security Payload, Seminar Presentation, Helsinki University of Technology, May 1996.*

Zhang, D. "Negotiating IPv6 Encapsulating Security Payload (ESP) Security Association (SA) with Cryptographically Generated Addresses (CGA) draft —dong-esp-sa-cga-00-txt" IETR Trust. Feb. 27, 2009.

International Search Report issued in corresponding PCT Application No. PCT/CN2009/072035; mailed Sep. 3, 2009.

Extended European Search Report issued in corresponding European Patent Application No. 09793810.4, mailed Jan. 25, 2012.

(Continued)

*Primary Examiner* — Venkat Perungavoor
(74) *Attorney, Agent, or Firm* — Brinks Hofer Gilson & Lione (57) ABSTRACT

A method, system, and device for negotiating a security association (SA) on an Internet Protocol version 6 (IPv6) network are disclosed. In this method, the initiator and the responder generate an SA through the interaction of two messages. Compared with the conventional procedure for setting up an SA based on the Internet Key Exchange Protocol (IKE), the interaction procedure in the present invention is simplified significantly. Therefore, the negotiation is faster and more convenient. In addition, with the present invention, cryptographically generated address parameters (CGA Params) are carried in the message and the CGA may be verified so that the invader cannot spoof the address.

12 Claims, 6 Drawing Sheets

OTHER PUBLICATIONS

Devarapalli et al., "Mobile IPv6 Operation with IKEv2 and the Revised IPsec Architecture" Network Working Group, Apr. 2007.

Kaufman, "Internet Key Exchange (IKEv2) Protocol" Network Working Group, Dec. 2005.

Laganier et al., "Using IKE with IPv6 Cryptographically Generated Addresses" Network Working Group, Jul. 8, 2007.

Zhang, "Negotiating IPv6 Encapsulating Security Payload (ESP) Security Association (SA) with Cryptographically Generated Addresses (CGA)" Network Working Group. Feb. 27, 2009.

Office Action issued in corresponding Chinese Patent Application No. 200810137713.7, mailed Sep. 21, 2011.

Written Opinion of the International Searching Authority issued in corresponding PCT Patent Application No. PCT/CN2009/072035, mailed Sep. 3, 2009.

Office Action issued in corresponding Chinese Patent Application No. 200810137713.7, mailed Aug. 1, 2012.

\* cited by examiner

METHOD, SYSTEM, AND DEVICE FOR NEGOTIATING SA ON IPV6 NETWORK

CROSS-REFERENCE TO RELATED APPLICATIONS

This application is a continuation of International Application No. PCT/CN2009/072035, filed on May 27, 2009, which claims priority to Chinese Patent Application No. 200810137713.7, filed on Jul. 11, 2008, both of which are hereby incorporated by reference in their entireties.

FIELD OF THE INVENTION

The present invention relates to the field of communication technologies, and in particular, to a method, a system, and a device for negotiating a security association (SA) on an Internet Protocol version 6 (IPv6) network.

BACKGROUND OF THE INVENTION

On an IPv6 network, Internet Protocol Security (IPSec) is used as a network security standard for implementation. IPSec provides security services such as connectionless data integrity, data source authentication, protection against replay attacks, data confidentiality, confidentiality of limited data streams, and access control for the IP and upper-layer protocols. To protect an IP packet, the communication parties on the IPv6 network require a method to protect related information such as the key and algorithm of the communication. All these parameters are stored in an SA. At present, SA negotiation in IPSec is mainly implemented via the Internet Key Exchange Protocol (IKE).

Specifically, the process of setting up an SA via IKE may be divided into two stages. Stage 1: Two parties negotiate to set up a communication channel IKE SA. The IKE SA is only used to protect data during setup of the IPSec SA and is not the expected SA. It is not used to protect normal communication data in the communication after the two parties negotiate the IKE SA. The communication channel is authenticated to provide the confidentiality, data integrity, and data source authentication services for further IKE communications of the two parties. At the same time, the first IPSec SA is set up. The first IPSec SA is the expected SA and is used to protect normal communication data of the two parties. At the first stage, the communication parties require four messages to complete the interaction. At the Second stage: The communication parties use the IKE SA that is set up to replace the IPSec SA. At this stage, the communication parties require two messages to complete the interaction.

During the implementation of the present invention, the inventor finds at least the following problems in the prior art:

The two stages in the SA negotiation process require six messages in total, thus causing the entire SA negotiation process to be complex and time-consuming.

SUMMARY OF THE INVENTION

Embodiments of the present invention provide a method, a system, and a device for negotiating an SA on an IPv6 network so that the SA negotiation is fast and convenient.

An embodiment of the present invention provides a method for negotiating an SA on an IPv6 network, where the method includes:

sending a request to a responder, where the request carries parameters required for SA generation;

receiving a response from the responder, where the response carries parameters required for SA generation; and generating an SA according to the response.

An embodiment of the present invention provides a method for negotiating an SA on an IPv6 network, where the method includes:

receiving a request from an initiator, where the request carries parameters required for SA generation;

generating a response according to the request, where the response carries parameters required for SA generation; and sending the response to the initiator, and generating an SA according to the request.

An embodiment of the present invention provides an initiator device for negotiating an SA on an IPv6 network, where the initiator device includes:

an initiator request sending unit, adapted to send a request to a responder device, where the request carries parameters required for SA generation;

an initiator response receiving unit, adapted to receive a response from the responder device, where the response carries parameters required for SA generation; and an initiator SA generating unit, adapted to generate an SA according to the response.

An embodiment of the present invention provides a responder device for negotiating an SA on an IPv6 network, where responder device includes:

a responder request receiving unit, adapted to receive a request from an initiator device, where the request carries parameters required for SA generation;

a responder response generating unit, adapted to generate a response according to the request received by the responder request receiving unit, where the response carries parameters required for SA generation;

a responder response sending unit, adapted to send the response generated by the responder response generating unit to the initiator device; and a responder SA generating unit, adapted to generate an SA according to the request.

An embodiment of the present invention provides a system for negotiating an SA on an IPv6 network, where the system includes:

an initiator device, adapted to: send a request to a responder device, where the request carries parameters required for SA generation; receive a response from the responder device, where the response carries parameters required for SA generation; and generate an SA according to the response; and the responder device, adapted to: receive the request from the initiator device, where the request carries the parameters required for SA generation; generate a response according to the request, where the response carries parameters required for SA generation; send the response to the initiator device; and generate an SA according to the request.

Compared with the conventional procedure for setting up the SA based on IKE, the interaction procedure required for negotiating the SA according to embodiments of the present invention is simplified significantly, and the number of messages required for the interaction decreases from 6 to 2. Therefore, the negotiation is faster and more convenient.

DETAILED DESCRIPTION OF THE EMBODIMENTS

Figure 1:
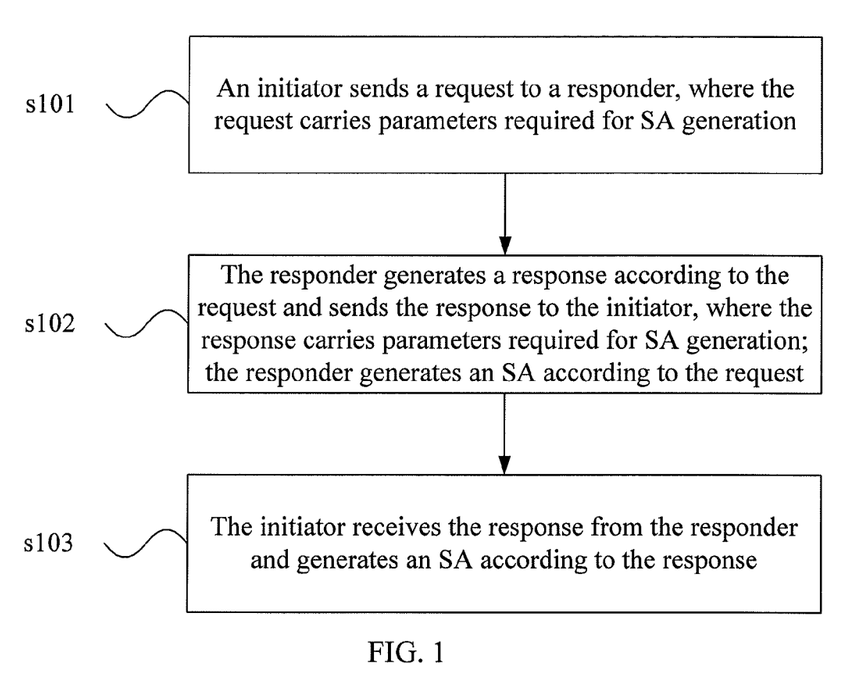
FIG. 1 shows a flowchart of a method for negotiating an SA according to an embodiment of the present invention.

As shown in FIG. 1, a method for negotiating an SA on an IPv6 network according to an embodiment of the present invention includes:

Step s101: An initiator sends a request to a responder, where the request carries parameters required for SA generation.

Step s102: The responder generates a response according to the request and sends the response to the initiator, where the response carries parameters required for SA generation; the responder generates an SA according to the request.

Step s103: The initiator receives the response from the responder; the initiator generates an SA according to the response.

Compared with the conventional procedure for setting up the SA based on IKE, the interaction procedure required for negotiating the SA according to embodiments of the present invention is simplified significantly, and the number of messages required for the interaction decreases from 6 to 2. Therefore, the negotiation is faster and more convenient.

Figure 2:
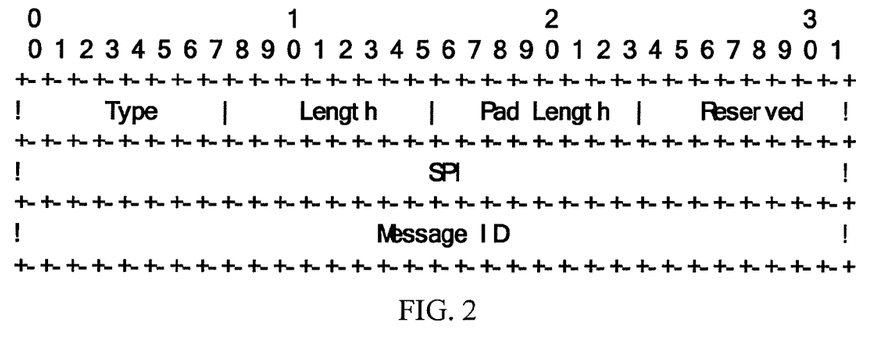
FIG. 2 shows a format of an ESP_INFO packet used in an embodiment of the present invention.

The following describes an Encapsulating Security Payload (ESP) protocol used in this embodiment. The ESP protocol is a protocol of IPSec, and is used to provide functions such as confidentiality of IP packets, data integrity, data source identification, and protection against replay attacks. In these embodiments, the initiator and the responder send a security parameter index (SPI) through the interaction of the ESP_INFO packet to specify the SA used by the peer and identify the Message ID when the peer sends the ESP_INFO packet. As shown in FIG. 2, the format of the ESP_INFO packet includes the following fields: Type, Length, Pad Length, Reserved, SPI, and Message ID.

The length of Type is 8 bits.

Length: The length is 8 bits and the unit is byte; it indicates the sum of lengths of all contents in the packet such as Type, Length, Pad Length, Reserved, SPI, and Message ID.

Pad Length: The length is 8 bits and the unit is byte; it indicates the padding length; if padding is empty, its value is 0.

Reserved: The length is 8 bits; it is used to carry the reserved field, and is set to 0 when not being used.

SPI: The length is 32 bits; its value is specified by the packet sender and it is used to point to the used SA.

Message ID: The length is 32 bits; it is used to identify each packet and prevent replay attacks. The Message ID is carried in the ESP_INFO packet, and may be used to coordinate the request and response of a message and identify retransmission of a message. In the first message sent by the initiator and the responder to the peer, the Message ID is 0, and then the initiator and the responder independently count their own messages sent to the peer. For a response corresponding to a request, the Message ID in the two messages is the same.

The method for negotiating an SA in this embodiment is applied in an end-to-end scenario where each endpoint needs to support IPSec. In IPv6, IPSec is forcibly added to the IP header. The application protocol can only be used to negotiate an ESP SA. Encryption and integrity protection of transmitted data are completed by ESP.

Figure 3:
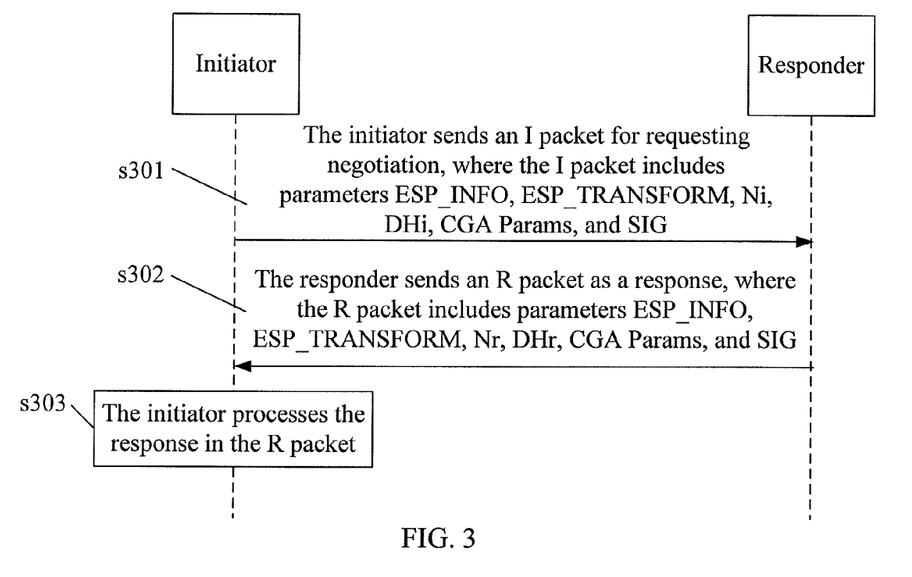
FIG. 3 shows another flowchart of a method for negotiating an SA according to an embodiment of the present invention.

As shown in FIG. 3, the method for negotiating an SA according to an embodiment of the present invention includes:

Step s301: An initiator sends an I packet to a responder to request negotiation, where the I packet is a type of request message. The I packet includes parameters ESP_INFO, ESP_TRANSFORM, Ni, DHi, CGA Params, and SIG, and may further include an optional CERT, which is a reserved option.

The following details the parameters.

ESP_INFO indicates the SA used when the initiator sends ESP data and identifies the Message ID.

ESP_TRANSFORM is used to carry a list of all encryption and authentication algorithms supported by the initiator.

Ni is used to carry the value of a random number (nonce) of the initiator.

DHi is used to carry basic material information required for the DH algorithm of the initiator to generate a shared secret.

CGA Params are various parameters required for generating a cryptographically generated address (CGA); specifically, the CGA protocol is a method for binding the public key and the IPv6 address; based on the CGA Params, an encrypted IPv6 address may be generated. The generation process is: The first 64-bit subnet prefix is allocated by the subnet, and the last 64 bits are an interface ID; the host generates a pair of public and private keys; the last 64-bit interface ID is generated by computing a one-way hash function according to the CGA Params consisting of the public key and other parameters.

SIG is used to carry the signature of the initiator.

CERT is used to carry the certificate of the initiator.

Step s302: The responder responds to the I packet, and sends an R packet to the initiator as a response, where the R packet is a type of response message. The R packet includes parameters ESP_INFO, ESP_TRANSFORM, Nr, DHr, CGA Params, and SIG and may further include an optional CERT.

In this step, the responder responds to each parameter in the I packet, and then sends the response to the initiator through the R packet; the R packet sent by the responder does not depend on the upper-layer protocol and is sent separately. Specifically, the procedure for the responder to respond to each parameter in the I packet includes:

(1) Use the received CGA to check whether the address of the initiator is legal.

If the address of the initiator is legal, continue responding to other parameters; if the address of the initiator is illegal, directly discard the I packet without processing the I packet or notifying the initiator.

(2) Use the received SIG parameter to check whether the signature of the peer is correct.

If the signature of the peer is correct, continue responding to other parameters; if the signature of the peer is incorrect, directly discard the I packet without processing the I packet or notifying the initiator.

(3) Check the Message ID in the received ESP_INFO packet.

If the Message ID is larger than the Message ID previously used to set up an SA with the initiator, in view of the sequential increase of the Message ID, continue responding to other parameters; if the Message ID is smaller than the Message ID previously used to set up an SA with the initiator, regard the I packet as a processed packet and discard it directly, without processing the I packet or notifying the initiator.

(4) Check whether a request has been sent to the initiator.

If no request has been sent to the initiator, continue responding to other parameters; if a request has been sent to the initiator, compare the value of the nonce in the request and the I packet; if the value of the nonce in the I packet is larger, respond to the peer; otherwise, discard the I packet and wait for the R packet from the peer. Determining whether to respond to the peer through comparison of the nonce value is preset. Considering that when the initiator sends an I packet to the responder, the responder may act as an initiator to send an I packet to the current initiator, a response rule may be preset to avoid scenarios where the initiator and responder respond to the I packet of the peer at the same time or scenarios where neither the initiator nor the responder responds to the I packet of the peer. The rule determines the party that needs to send an R packet to the peer. Specifically, in this embodiment, taking the nonce value as a rule for judgment, it may be specified that the party that sends the I packet with a smaller or larger nonce value should send an R packet to the peer.

(5) View the cryptographic suite in the received ESP_TRANSFORM.

If the algorithm list of ESP_TRANSFORM has an appropriate suite, write the appropriate suite into the ESP_TRANSFORM of the R packet; if no appropriate suite is available, discard the I packet, and use a Notify message NO_PROPOSAL_CHOSEN to notify the peer, indicating no appropriate cryptographic suite is available.

(6) View the DH payload of the peer.

Select a suitable DH group. In this embodiment, supposing each negotiation device supports at least two specified DH groups, a suitable DH group can be selected. Use the selected DH group to generate a DH shared secret, generate a key material according to the DH shared secret, and generate an ESP key according to the key material.

Responding to each parameter in the I packet by the responder means checking each parameter, and the sequence of checking parameters may be adjusted according to the requirement and is not limited to the preceding sequence.

When processing the I packet, the responder may determine contents of an SA; after processing the I packet, the responder may generate an SA according to the negotiated algorithm and key material, including contents such as the ESP key. In subsequent ESP communications, if the responder receives an encrypted packet from the initiator, the responder may process the packet by using the negotiated SA.

Step s303: After receiving the R packet from the responder, the initiator processes the response in the R packet.

In this step, after receiving the R packet from the responder, the initiator verifies the information of the responder such as CGA and signature, and then checks whether the initiator has sent an I packet to the sender of the R packet. Specifically, the procedure for the initiator to process each parameter in the R packet includes:

(1) Use the received CGA Params and SIG to check whether the CGA and signature of the responder are correct.

If both are correct, continue processing other parameters; if either is incorrect, directly discard the R packet without processing the R packet or notifying the responder.

(2) Check whether the Message ID in the R packet is the same as the Message ID used when sending the I packet.

If the Message ID in the R packet is the same as the Message ID used when sending the I packet, continue processing other parameters; if the Message ID in the R packet is different from the Message ID used when sending the I packet, directly discard the R packet without processing the R packet or notifying the responder.

(3) View the contents in the ESP_TRANSFORM.

If the responder selects a cryptographic suite provided by the initiator, the cryptographic suite should be used in subsequent communications; if the cryptographic suite provided by the initiator is not selected by the peer, directly discard the R packet without processing the R packet and terminate the negotiation.

(4) View the content of the DH payload.

Generate a DH shared secret according to the DH group of the responder carried in the DH payload; generate a key material according to the DH shared secret; and generate an ESP key according to the key material.

After the preceding process, the initiator may determine contents of an SA; after processing the R packet, the initiator may generate an SA according to the negotiated algorithm and key material, including contents such as the ESP key. In subsequent ESP communications, if the initiator receives an encrypted packet from the responder, the initiator may process the packet by using the negotiated SA.

It should be noted that, because the initiator may retransmit multiple I packets previously, the initiator may receive multiple R packets later. In this case, the initiator only needs to respond to the R packet that arrives first, and discard all the packets that arrive later. In addition, in step s302, if the responder is unwilling to set up an ESP association with the initiator, the responder does not need to process the I packet. This may prevent denial of service (DoS) attacks to a certain extent. In addition, when the responder responds to the I packet, the responder needs to limit the frequency of receiving the I packet from the same IP address; the responder may not respond to the initiator that sends the I packet frequently.

Figure 4:
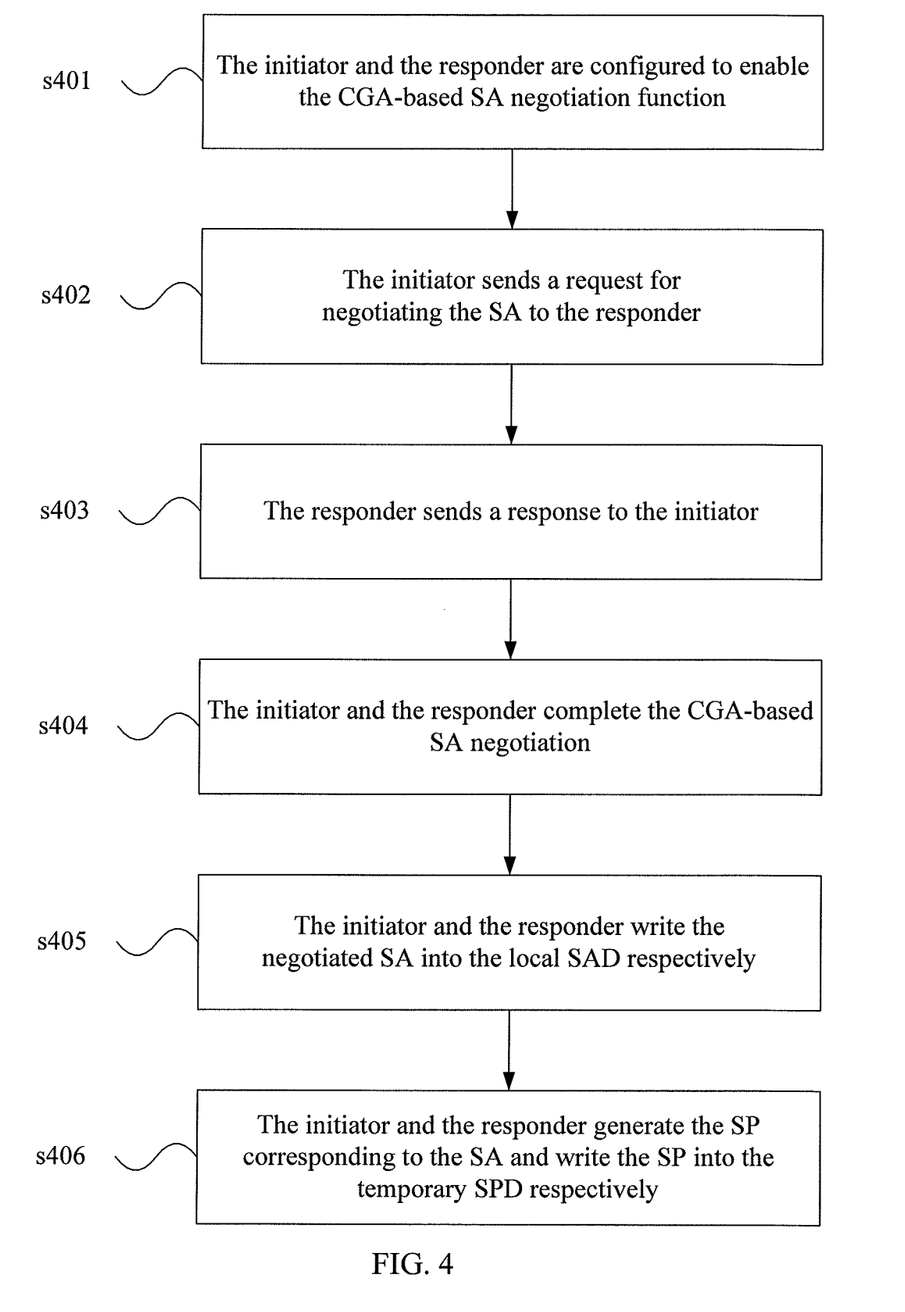
FIG. 4 shows still another flowchart of a method for negotiating an SA according to an embodiment of the present invention.

As shown in FIG. 4, a method for negotiating an SA in an embodiment of the present invention includes:

Step s401: The initiator and the responder are configured to enable the CGA-based SA negotiation function.

Specifically, the initiator may be configured to enable the CGA-based SA negotiation function through the user interface of the initiator; and the responder may be configured to enable the CGA-based SA negotiation function through the user interface of the responder.

Step s402: The initiator sends a request for negotiating the SA to the responder.

Specifically, the initiator views the configuration after sending a packet to the responder, and decides to trigger SA negotiation.

Step s403: The responder sends a response to the initiator.

Step s404: The initiator and the responder complete the CGA-based SA negotiation.

For specific implementation of steps s402-s404, see the procedure in FIG. 3 and descriptions in related embodiments.

Step s405: The initiator and the responder write the negotiated SA into a local security association database (SAD) respectively.

Step s406: The initiator and the responder generate a security policy (SP) corresponding to the SA and write the SP to a temporary security policy database (SPD) respectively.

One SP has three choices for processing a packet: DISCARD, BYPASS, and PROTECT. DISCARD indicates that the packet is not allowed to pass through the device; BYPASS indicates that the packet is allowed to directly pass through the device for continuous transmission without extra IPSec processing; PROTECT indicates that the packet requires IPSec processing.

Up to now, SA negotiation is completed, but the negotiated SA is not enabled yet. If the negotiated SA needs to be enabled, the SP in the temporary SPD needs to be stored in the SPD, and the initiator and the responder begin to use the negotiated SA for transmitting data.

Compared with the conventional procedure for setting up the SA based on IKE, the interaction procedure in embodiments of the present invention is simplified significantly, and the number of messages required for the interaction decreases from 6 to 2. Therefore, the negotiation is faster and more convenient. In addition, the CGA verification function is added for the message so that the address cannot be spoofed by any invader and that the security of SA negotiation is improved; taking the common man-in-the-middle attack as an example, the man-in-the-middle (host C, an attacker) is located between the communication initiator (host A) and the responder (host B), and communicates with hosts A and B respectively by spoofing the addresses of the initiator and responder. If host A knows the address of host B, with the method of embodiments of the present invention, the attacker cannot tamper the message sent by host B to host A, because the identity (public key) and the address are bound by applying the CGA, so that the attacker does not know the private key of host B and cannot obtain the correct signature of the message after tampering. In addition, in embodiments of the present invention, the CGA is used as an IPv6 extension header; the negotiation procedure is transferred from the application layer to the network layer so that the SA negotiation is completed just through a simple received or sent packet without installing IKE, which is completely transparent to the user. At last, embodiments of the present invention provide settings of the temporary SPD, which may be used to store the SP generated by the negotiated SA and synchronize the SP in the temporary SPD to the SPD when required. Therefore, the negotiated SA is used in the data interaction.

Figure 5:
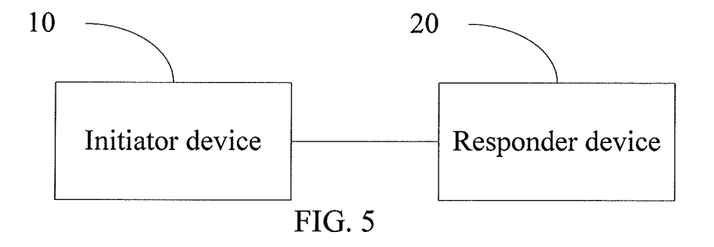
FIG. 5 shows a structure of a system for negotiating an SA according to an embodiment of the present invention.

As shown in FIG. 5, a system for negotiating an SA in an embodiment of the present invention includes:

an initiator device 10, adapted to: send a request to a responder device 20, where the request carries parameters required for SA generation; receive a response from the responder device 20, where the response carries parameters required for SA generation; and generate an SA; and the responder device 20, adapted to: receive the request from the initiator device 10, where the request carries parameters required for SA generation; send a response to the initiator device 10, where the response carries parameters required for SA generation; and generate an SA.

Figure 6:
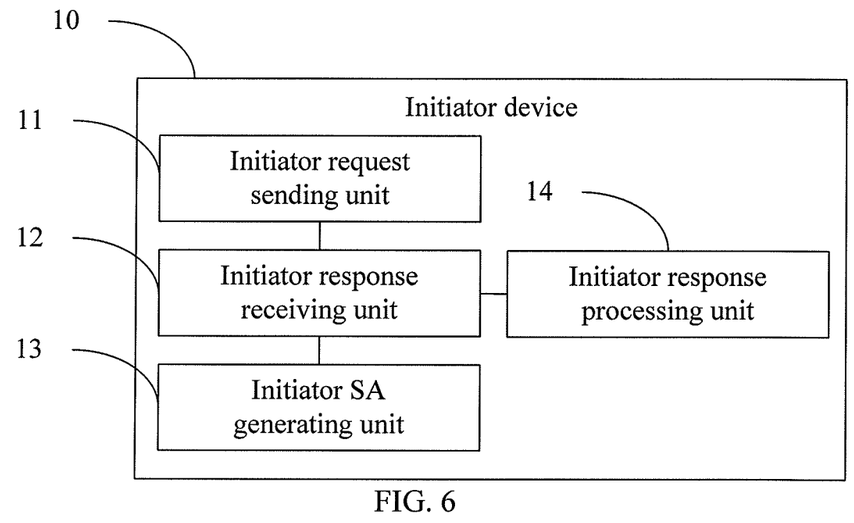
FIG. 6 shows a structure of an initiator device according to an embodiment of the present invention.

As shown in FIG. 6, the structure of the initiator device 10 may include:

an initiator request sending unit 11, adapted to send a request to a responder, where the request carries parameters required for SA generation;

an initiator response receiving unit 12, adapted to receive a response from the responder, where the response carries parameters required for SA generation; and an initiator SA generating unit 13, adapted to generate an SA according to the response.

The initiator device 10 may further include an initiator response processing unit 14.

The initiator response processing unit 14 is adapted to process the response received by the initiator response receiving unit 12. The processing includes:

checking whether the Message ID carried in the response is the same as the Message ID carried in the request, and if the Message ID carried in the response is different from the Message ID carried in the request, discarding the response;

checking the contents of the ESP_TRANSFORM carried in the response, judging whether the cryptographic suite selected by the responder is the one carried in the ESP_TRANSFORM in the request, and if the cryptographic suite selected by the responder is not the one carried in the ESP_TRANSFORM in the request, discarding the response; and verifying the address and signature of the responder through the CGA Params and SIG carried in the response, and if the verification fails, discarding the response.

Figure 7:
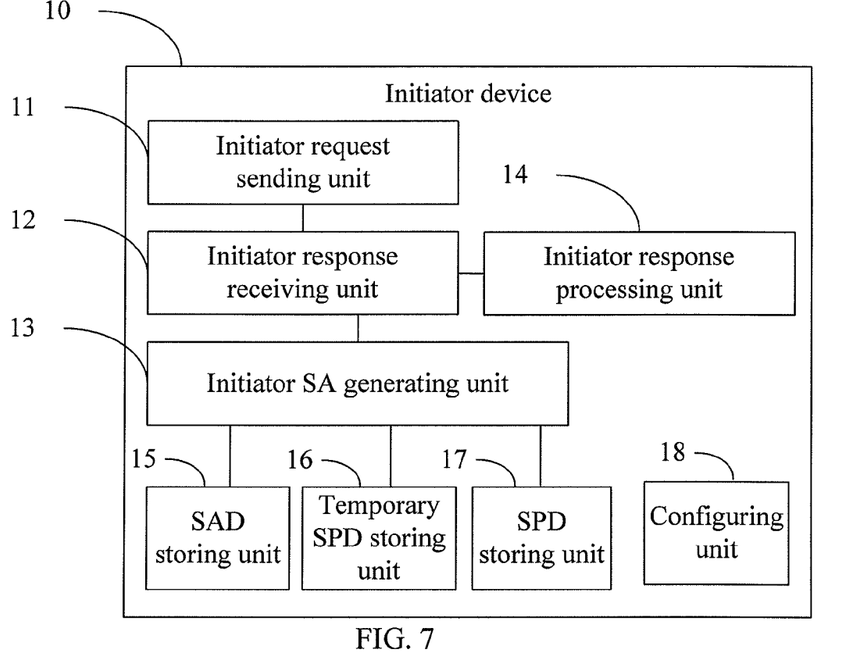
FIG. 7 shows another structure of an initiator device according to an embodiment of the present invention.

As shown in FIG. 7, the initiator device 10 in another embodiment of the present invention further includes:

an SAD storing unit 15, adapted to store the negotiated SA generated by the initiator SA generating unit 13;

a temporary SPD storing unit 16, adapted to generate a corresponding SP according to the SA generated by the initiator SA generating unit 13 and store the SP, where the temporary SPD storing unit 16 may be a storage space in the initiator device;

an SPD storing unit 17, adapted to: store the SP currently used by the initiator device and the responder device; when the recently negotiated SA is required, synchronize the SP stored in the temporary SPD storing unit 16 to the SPD storing unit 17, whereupon the initiator device begins to use the negotiated SA for transmitting data to the responder device; and a configuring unit 18, adapted to configure the initiator device 10 to enable the CGA-based SA negotiation function through an interface.

Figure 8:
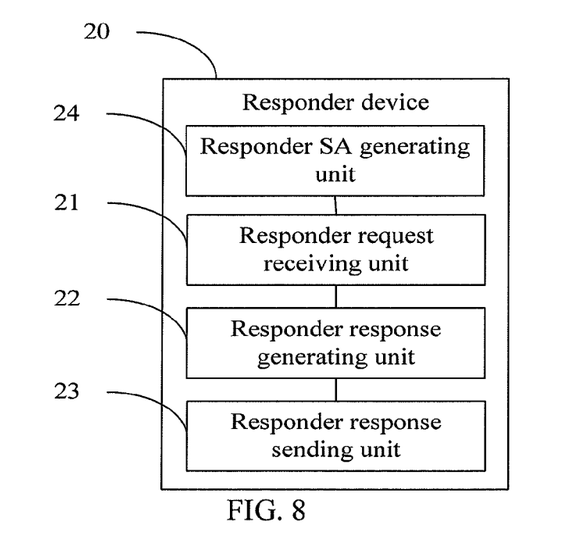
FIG. 8 shows a structure of a responder device according to an embodiment of the present invention.

As shown in FIG. 8, the structure of the responder device 20 may include:

a responder request receiving unit 21, adapted to receive a request from an initiator, where the request carries parameters required for SA generation;

a responder response generating unit 22, adapted to generate a response according to the request received by the responder request receiving unit, where the response carries parameters required for SA generation;

a responder response sending unit 23, adapted to send the response generated by the responder response generating unit 22 to the initiator; and a responder SA generating unit 24, adapted to generate an SA according to the request.

The procedure for the responder response generating unit 22 to generate a response according to the request includes:

using the SIG in the request to check whether the signature of the initiator is correct, and if the signature of the initiator is incorrect, discarding the request;

checking the Message ID of the ESP_INFO in the request, and if the Message ID is smaller than the Message ID previously used to set up the SA with the initiator, discarding the request;

checking whether a request has been sent to the initiator, comparing the value of the nonce in the two requests if a request has been sent to the initiator, and discarding the request if the value of the nonce in the initiator request is smaller;

checking whether the ESP_TRANSFORM in the request has an appropriate cryptographic suite, and writing the appropriate cryptographic suite into the ESP_TRANSFORM in the response if the ESP_TRANSFORM in the request has an appropriate cryptographic suite, or discarding the request and notifying the initiator that no appropriate cryptographic suite is available if the ESP_TRANSFORM in the request does not have an appropriate cryptographic suit; and using the CGA Params in the request to check whether the address of the initiator is legal, and if the address of the initiator is illegal, discarding the request.

Figure 9:
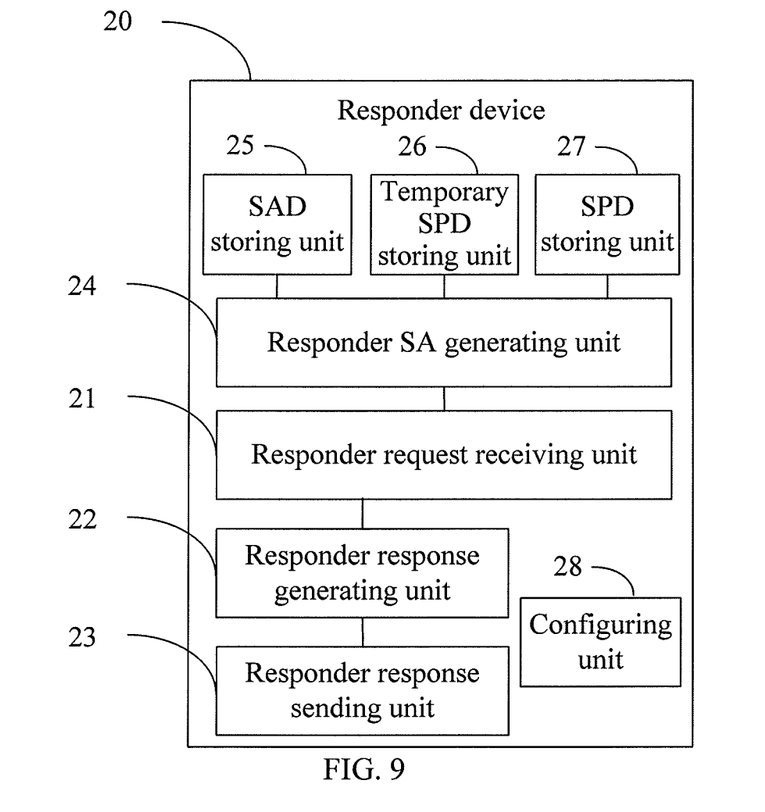
FIG. 9 shows another structure of a responder device according to an embodiment of the present invention.

As shown in FIG. 9, the responder device 20 in another embodiment of the present invention further includes:

an SAD storing unit 25, adapted to store the SA generated by the responder SA generating unit 24;

a temporary SPD storing unit 26, adapted to generate a corresponding SP according to the SA generated by the responder SA generating unit 24 and store the SP, where the temporary SPD storing unit 26 may be a storage space in the responder device;

an SPD storing unit 27, adapted to: store the SP currently used by the responder device and the initiator device; when the recently negotiated SA is required, synchronize the SP stored in the temporary SPD storing unit 26 to the SPD storing unit 27, whereupon the responder device begins to use the negotiated SA for transmitting data to the responder device; and a configuring unit 28, adapted to configure the responder device 20 to enable the CGA-based SA negotiation function through an interface.

Compared with the conventional procedure for setting up the SA based on IKE, with the system and device provided in embodiments of the present invention, the interaction procedure required for negotiating the SA is simplified significantly, and the number of messages required for the interaction decreases from 6 to 2. Therefore, the negotiation is faster and more convenient. In addition, the CGA verification function is added for the message. Therefore, the invader cannot spoof the address and the security of SA negotiation is improved. In addition, in embodiments of the present invention, the CGA is used as an IPv6 extension header; the negotiation procedure is transferred from the application layer to the network layer so that the SA negotiation is completed just through a simple received or sent packet without installing IKE, which is completely transparent to the user. At last, embodiments of the present invention provide settings of the temporary SPD, which may be used to store the SP generated by the negotiated SA and synchronize the SP in the temporary SPD to the SPD when required. Therefore, the negotiated SA is used in the data interaction.

Through the descriptions of the preceding embodiments, those skilled in the art may understand that the present invention may be implemented by hardware only or by software and a necessary universal hardware platform. Based on such understandings, the technical solution under the present invention may be embodied in the form of a software product. The software product may be stored in a nonvolatile storage medium, which can be a compact disk read-only memory (CD-ROM), a USB disk, or a removable hard disk. The software product includes a number of instructions that enable a computer device (personal computer, server, or network device) to execute the methods provided in the embodiments of the present invention.

The above descriptions are merely some exemplary embodiments of the present invention, but not intended to limit the scope of the present invention. Any modifications or variations that can be derived by those skilled in the art should fall within the scope of the present invention.

What is claimed is:

1. A machine implemented method for negotiating a security association (SA) on an Internet Protocol version 6 (IPv6) network, comprising:
   sending a single request message to a responder, wherein the single request message carries parameters required for SA generation;
   subsequent to the responder processing the single request message, receiving a single response message from the responder, wherein the received single response message carries parameters required for SA generation; and generating an SA according to the received single response message;
   generating a security policy (SP) corresponding to the SA and storing the SP to a temporary security policy database (SPD); and
   synchronizing the SP stored in the temporary SPD to an SPD that is currently used if the SA is required.

2. The machine implemented method of claim 1, wherein the parameters required for SA generation comprise: encrypting security payload information (ESP_INFO), list of ESP algorithms (ESP_TRANSFORM), random number (nonce), key exchange material DH, and signature (SIG), wherein the ESP_INFO carries a security parameter index (SPI) indicating the SA used in message communications and a Message ID.

3. The machine implemented method of claim 1, after receiving the single response message from the responder, further comprising processing the response, wherein the processing comprising:
   checking whether the Message ID carried in the received single response message is the same as the Message ID carried in the single request message, and if the Message ID carried in the received single response message is different from the Message ID carried in the single request message, discarding the received single response message;
   checking whether a cryptographic suite in a list of ESP algorithms (ESP_TRANSFORM) in the received single response message is a cryptographic suite in an ESP_TRANSFORM in the single request message, and if a cryptographic suite in a list of ESP algorithms (ESP_TRANSFORM) in the received single response message is not a cryptographic suite in an ESP_TRANSFORM in the single request message, discarding the received single response message; and
   checking an address and a signature of the responder according to the cryptographically generated address parameters (CGA Params) and SIG carried in the received single response message, and if the check result is incorrect, discarding the received single response message.

4. The machine implemented method of claim 1, wherein before sending the single request message to the responder, the method further comprising:
   enabling a cryptographically generated address (CGA)-based SA negotiation function through an interface.

5. A machine implemented method for negotiating a security association (SA) on an Internet Protocol version 6 (IPv6) network, comprising:
   receiving a request message from an initiator, wherein the request carries parameters required for SA generation;
   generating a response message according to the single request message, wherein the single response message carries parameters required for SA generation; and
   sending the response message to the initiator, and generating an SA according to the request message;
   generating a security policy (SP) corresponding to the SA and storing the SP to a temporary security policy database (SPD);
   synchronizing the SP stored in the temporary SPD to an SPD that is currently used if the SA is required.

6. The machine implemented method of claim 5, wherein the parameters required for SA generation comprise: encrypting security payload information (ESP_INFO), list of ESP algorithms (ESP_TRANSFORM), random number (nonce), key exchange material DH, and signature (SIG), wherein the ESP_INFO carries a security parameter index (SPI) indicating the SA used in message communications and a Message ID.

7. The machine implemented method of claim 6, wherein the step of generating the single response message according to the single request message comprising:
    using the SIG in the single request message to check whether the signature of the initiator is correct, and if the signature of the initiator is incorrect, discarding the single request message;
    checking the Message ID of the ESP_INFO in the single request message, and if the Message ID is smaller than the Message ID previously used to set up the SA with the initiator, discarding the single request message;
    checking whether another single request message has been sent to the initiator, and if the another single request message has been sent to the initiator, determining whether to discard the single request message according to a corresponding nonce value in each of the two single request messages;
    checking whether the ESP_TRANSFORM in the single request message has an appropriate cryptographic suite, and writing the appropriate cryptographic suite into the ESP_TRANSFORM in the single response message if the ESP_TRANSFORM in the single request message has an appropriate cryptographic suite, or discarding the single request message and notifying the initiator that no appropriate cryptographic suite is available if the ESP_TRANSFORM in the single request message does not have an appropriate cryptographic suite; and
    using cryptographically generated address parameters (CGA Params) in the single request message to check whether an address of the initiator is legal, and if the address of the initiator is illegal, discarding the single request message.

8. The machine implemented method of claim 5, wherein before receiving the single request message from the initiator, the method further comprising:
    enabling a CGA-based SA negotiation function through an interface.

9. An initiator device for negotiating a security association (SA) on an Internet Protocol version 6 (IPv6) network, comprising:
    at least a processor configured to facilitate the negotiating of the SA; an initiator request sending unit, adapted to send a single request message to a responder device, wherein the single request message carries parameters required for SA generation;
    an initiator response receiving unit, adapted to receive a response message from the responder device, wherein the single response message carries parameters required for SA generation; and
    an initiator SA generating unit, adapted to generate an SA according to the single response message;
    wherein the initiator device further comprising:
    a security association database (SAD) storing unit, adapted to store the SA generated by the initiator SA generating unit;
    a temporary security policy database (SPD) storing unit, adapted to generate a corresponding security policy (SP) according to the SA generated by the initiator SA generating unit and store the SP; and
    an SPD storing unit, adapted to: store the SP currently used by the initiator device and the responder device; when the recently negotiated SA is required, synchronize the SP stored in the temporary SPD storing unit to the SPD storing unit.

10. The initiator device of claim 9, further comprising:
    a configuring unit, adapted to enable a cryptographically generated address (CGA)-based SA negotiation function through an interface.

11. A responder device for negotiating a security association (SA) on an Internet Protocol version 6 (IPv6) network, comprising:
    at least a processor configured to facilitate the negotiating of the SA; a responder request receiving unit, adapted to receive a single request message from an initiator device, wherein the request message carries parameters required for SA generation;
    a responder response generating unit, adapted to generate a single response message according to the single request message received by the responder request receiving unit, wherein the response message carries parameters required for SA generation;
    a responder response sending unit, adapted to send the single response message generated by the responder response generating unit to the initiator device; and
    a responder SA generating unit, adapted to generate an SA according to the request message;
    a security association database (SAD) storing unit, adapted to store the SA generated by the responder SA generating unit;
    a temporary security policy database (SPD) storing unit, adapted to generate a corresponding security policy (SP) according to the SA generated by the responder SA generating unit and store the SP; and
    an SPD storing unit, adapted to: store the SP currently used by the initiator device and the responder device; when the recently negotiated SA is required, synchronize the SP stored in the temporary SPD storing unit to the SPD storing unit.

12. The responder device of claim 11, further comprising:
    a configuring unit, adapted to enable a cryptographically generated address (CGA)-based SA negotiation function through an interface.

* * * * *

UNITED STATES PATENT AND TRADEMARK OFFICE
CERTIFICATE OF CORRECTION

PATENT NO. : 8,418,242 B2
APPLICATION NO. : 12/987502
DATED : April 9, 2013
INVENTOR(S) : Dong Zhang et al.

It is certified that error appears in the above-identified patent and that said Letters Patent is hereby corrected as shown below:

In the Claims

In column 10, claim 5, line 51, before "request message from an" insert --single--.

In column 10, claim 5, line 53, before "response message according" insert --single--.

In column 10, claim 5, line 56, before "response message to the initiator," insert --single--.

In column 11, claim 9, line 51, before "response message from" insert --single--.

In column 12, claim 11, line 25, after "device, wherein the" insert --single--.

In column 12, claim 11, line 30, before "response message carries" insert --single--.

In column 12, claim 11, line 36, after "according to the" insert --single--.

Signed and Sealed this
Second Day of July, 2013

Teresa Stanek Rea
*Acting Director of the United States Patent and Trademark Office*